(12) United States Patent
Ramnath et al.

(10) Patent No.: US 12,217,524 B2
(45) Date of Patent: Feb. 4, 2025

(54) SYSTEMS AND METHODS FOR AUTOMATED END-TO-END TEXT EXTRACTION OF ELECTRONIC DOCUMENTS

(71) Applicant: FMR LLC, Boston, MA (US)

(72) Inventors: Keerthan Ramnath, Chennai (IN); Punitha Chandrasekar, Bangalore (IN); Hui Su, West Roxbury, MA (US); Shyam Subramanian, Norwood, MA (US); Rachna Saxena, Bangalore (IN); Mohamed Mahdi Alouane, Toronto (CA); Vinay Iyengar, Westwood, MA (US)

(73) Assignee: FMR LLC, Boston, MA (US)

( * ) Notice: Subject to any disclaimer, the term of this patent is extended or adjusted under 35 U.S.C. 154(b) by 408 days.

(21) Appl. No.: 17/850,618

(22) Filed: Jun. 27, 2022

(65) Prior Publication Data
US 2023/0419711 A1    Dec. 28, 2023

(51) Int. Cl.
*G06V 30/414* (2022.01)
*G06F 40/232* (2020.01)
(Continued)

(52) U.S. Cl.
CPC ......... *G06V 30/414* (2022.01); *G06F 40/232* (2020.01); *G06F 40/263* (2020.01); *G06F 40/284* (2020.01)

(58) Field of Classification Search
CPC ............................. G06V 30/148; G06V 30/418
See application file for complete search history.

(56) References Cited

U.S. PATENT DOCUMENTS 8,503,781 B2    8/2013   Chen et al.
10,489,682 B1  11/2019  Kumar et al.
(Continued)

OTHER PUBLICATIONS

Junker et al., "Evaluating OCR and non-OCR text representations for learning document classifiers," Proceedings of the Fourth International Conference on Document Analysis and Recognition, Ulm, Germany, 1997, pp. 1060-1066 vol. 2, doi: 10.1109/ICDAR.1997.620671.*

(Continued)

*Primary Examiner* — Guillermo M Rivera-Martinez
(74) *Attorney, Agent, or Firm* — Cesari and McKenna, LLP (57) ABSTRACT

Systems and methods for extracting data from electronic documents using optical character recognition (OCR) and non-OCR based text extraction. A server computing device initiates non-OCR based text extraction for each page of an electronic document. The server calculates a document text coverage percentage corresponding to the non-OCR based text extraction for the whole document and, in response to determining that the document text coverage percentage is below a first threshold, initiates OCR for the document. The server calculates a page text coverage percentage corresponding to the non-OCR based text extraction for one or more pages of the electronic document and, in response to determining that the page text coverage percentage is below a second threshold, initiates OCR for the pages. The server combines first text extracted from the electronic document using non-OCR based text extraction and second text extracted from the electronic document using OCR.

20 Claims, 5 Drawing Sheets

(51) Int. Cl.
*G06F 40/263* (2020.01)
*G06F 40/284* (2020.01)

(56) References Cited

U.S. PATENT DOCUMENTS

| | | | | |
|---|---|---|---|---|
| 2002/0012465 A1* | 1/2002 | Fujimoto | ............. | G06V 30/414 |
| | | | | 382/199 |
| 2008/0170810 A1* | 7/2008 | Wu | .................. | G06V 30/18143 |
| | | | | 382/305 |
| 2017/0124413 A1* | 5/2017 | Deng | ................... | G06V 30/153 |
| 2022/0067275 A1* | 3/2022 | Zeng | ................... | G06V 30/412 |

OTHER PUBLICATIONS

Tan et al., "Imaged document text retrieval without OCR," in IEEE Transactions on Pattern Analysis and Machine Intelligence, vol. 24, No. 6, pp. 838-844, Jun. 2002, doi: 10.1109/TPAMI.2002. 1008389.*

H. Bast and C. Korzen, "A Benchmark and Evaluation for Text Extraction from PDF," JCDL '17, Toronto, Ontario, Canada, 2017, 10 pages.

C. Yu et al., "Extracting Body Text from Academic PDF Documents for Text Mining," arXiv:2010.12647v1 [cs.IR] Oct. 23, 2020, available at https://arxiv.org/pdf/2010.12647v1, 8 pages.

* cited by examiner

SYSTEMS AND METHODS FOR AUTOMATED END-TO-END TEXT EXTRACTION OF ELECTRONIC DOCUMENTS

TECHNICAL FIELD

The present invention relates generally to systems and methods for extracting text from electronic documents, including systems and methods for combining extracted text from electronic documents.

BACKGROUND

Many electronic documents are complex and are available in different forms, such as text-based or scanned documents, or combinations of both, as they are processed by different record-keepers. Accuracy of computerized information extraction from these forms completely relies on the quality of text extraction from the electronic documents. However, the presence of images or problems in text font can cause various issues if text is extracted directly from the electronic document. These issues include joint and misspelled words and, in severe cases, the occurrence of junk words.

Optical character recognition (OCR) has its own drawbacks such as inaccurate text after conversion, high processing latency, and memory usage. Therefore, there is a need for a software tool that is able to automatically manage and trigger optical character recognition on electronic documents only when required, and combine the results from optical character recognition and non-OCR based text extraction methods.

SUMMARY

Accordingly, an object of the invention is to provide systems and methods for extracting data from electronic documents. It is an object of the invention to provide systems and methods for extracting data from electronic documents using optical character recognition (OCR) and non-OCR based text extraction. It is an object of the invention to provide systems and methods for extracting data from electronic documents using non-OCR based text extraction and optical character recognition. It is an object of the invention to provide systems and methods for combining text extracted from an electronic document using non-OCR based text extraction and text extracted from an electronic document using optical character recognition.

The invention, in some aspects, features a computerized method for extracting data from electronic documents using optical character recognition (OCR) and non-OCR based text extraction includes initiating non-OCR based text extraction for each page of an electronic document. The computerized method also includes calculating a document text coverage percentage corresponding to the non-OCR based text extraction for the electronic document as a whole. The computerized method also includes, in response to determining that the document text coverage percentage for the electronic document as a whole is below a first threshold, initiating OCR for the electronic document as a whole. The computerized method further includes calculating a page text coverage percentage corresponding to the non-OCR based text extraction for each of the pages of the electronic document. The computerized method also includes, in response to determining that the page text coverage percentage for one or more pages of the electronic document is below a second threshold, initiating OCR for the one or more pages. The computerized method further includes combining first text extracted from the electronic document using non-OCR based text extraction and second text extracted from the electronic document using OCR.

The invention, in some aspects, features a computerized method for extracting data from electronic documents using non-OCR based text extraction and OCR includes initiating non-OCR based text extraction for each page of an electronic document. The computerized method also includes determining an amount of pages including at least one image. The computerized method also includes receiving a runtime exception during non-OCR based text extraction or determining that the amount of pages exceeds a first threshold. The computerized method further includes initiating optical character recognition for each of the pages of the electronic document. The computerized method also includes determining an image coverage percentage for each of the pages of the electronic document.

The computerized method further includes determining that the image coverage percentage exceeds a second threshold for a page of the electronic document. The computerized method also includes initiating optical character recognition for the page of the electronic document. The computerized method further includes calculating an accuracy of the non-OCR based text extraction performed for each of the pages of the electronic document. The computerized method also includes determining that the accuracy of the non-OCR based text extraction is less than a third threshold for a page of the electronic document. The computerized method further includes initiating optical character recognition for the page of the electronic document. The computerized method also includes combining first text extracted from the electronic document using non-OCR based text extraction and second text extracted from the electronic document using optical character recognition.

In some embodiments, the computerized method proceeds to generate a data structure including the combined first text and second text extracted from the electronic document and store the data structure in a database.

In some embodiments, the computerized method proceeds to determine, for each of the pages of the electronic document, whether the page of the electronic document includes a non-searchable image. For example, in some embodiments, the computerized method proceeds to, in response to determining that the page of the electronic document includes the non-searchable image, initiate optical character recognition for the page of the electronic document.

In some embodiments, the computerized method proceeds to calculate the accuracy of the non-OCR based text extraction by calculating a percentage of extracted words that are English words.

In some embodiments, the computerized method proceeds to remove one or more watermarks from the electronic document prior to initiating optical character recognition.

In other embodiments, the computerized method proceeds to correct the combined first text and second text extracted from the electronic document by replacing misspelled words.

In some embodiments, the first threshold is at least 90% of the pages of the electronic document. In some embodiments, the second threshold is an image coverage of at least 50%. In some embodiments, the third threshold is an accuracy of at least 85%.

The invention, in some aspects, features a system for extracting data from electronic documents using non-OCR based text extraction and optical character recognition includes a server computing device communicatively coupled to a database system over a network. The server computing device is configured to initiate non-OCR based text extraction for each of the pages of an electronic document. The server computing device is also configured to determine an amount of pages includes at least one image. The server computing device is also configured to receive a runtime exception during non-OCR based text extraction or determine that the amount of pages exceeds a first threshold. The server computing device is further configured to initiate optical character recognition for each of the pages of the electronic document. The server computing device is also configured to determine an image coverage percentage for each of the pages of the electronic document.

The server computing device is further configured to determine that the image coverage percentage exceeds a second threshold for a page of the electronic document. The server computing device is also configured to initiate optical character recognition for the page of the electronic document. The server computing device is further configured to calculate an accuracy of the non-OCR based text extraction performed for each of the pages of the electronic document. The server computing device is also configured to determine that the accuracy of the non-OCR based text extraction is less than a third threshold for a page of the electronic document. The server computing device is further configured to initiate optical character recognition for the page of the electronic document. The server computing device is also configured to combine first text extracted from the electronic document using non-OCR based text extraction and second text extracted from the electronic document using optical character recognition.

In some embodiments, the server computing device is configured to generate a data structure including the combined first text and second text extracted from the electronic document and store the data structure in a database.

In some embodiments, the server computing device is configured to determine, for each of the pages of the electronic document, whether the page of the electronic document includes a non-searchable image. For example, in some embodiments, the server computing device is configured to, in response to determining that the page of the electronic document includes the non-searchable image, initiate optical character recognition for the page of the electronic document.

In some embodiments, the server computing device is configured to calculate the accuracy of the non-OCR based text extraction by calculating a percentage of extracted words that are English words.

In some embodiments, the server computing device is configured to remove one or more watermarks from the electronic document prior to initiating optical character recognition.

In some embodiments, the server computing device is configured to correct the combined first text and second text extracted from the electronic document by replacing misspelled words.

In some embodiments, the first threshold is at least 90% of the pages of the electronic document. In some embodiments, the second threshold is an image coverage of at least 50%. In some embodiments, the third threshold is an accuracy of at least 85%.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

In some aspects, the systems and methods described herein can include one or more mechanisms or methods for extracting data from electronic documents. The systems and methods described herein can include mechanisms or methods for extracting data from electronic documents using optical character recognition (OCR) and non-OCR based text extraction. The systems and methods described herein can include mechanisms or methods for extracting data from electronic documents using non-OCR based text extraction and optical character recognition. The systems and methods described herein can include mechanisms or methods for combining text extracted from an electronic document using non-OCR based text extraction and text extracted from an electronic document using optical character recognition.

Figure 1:
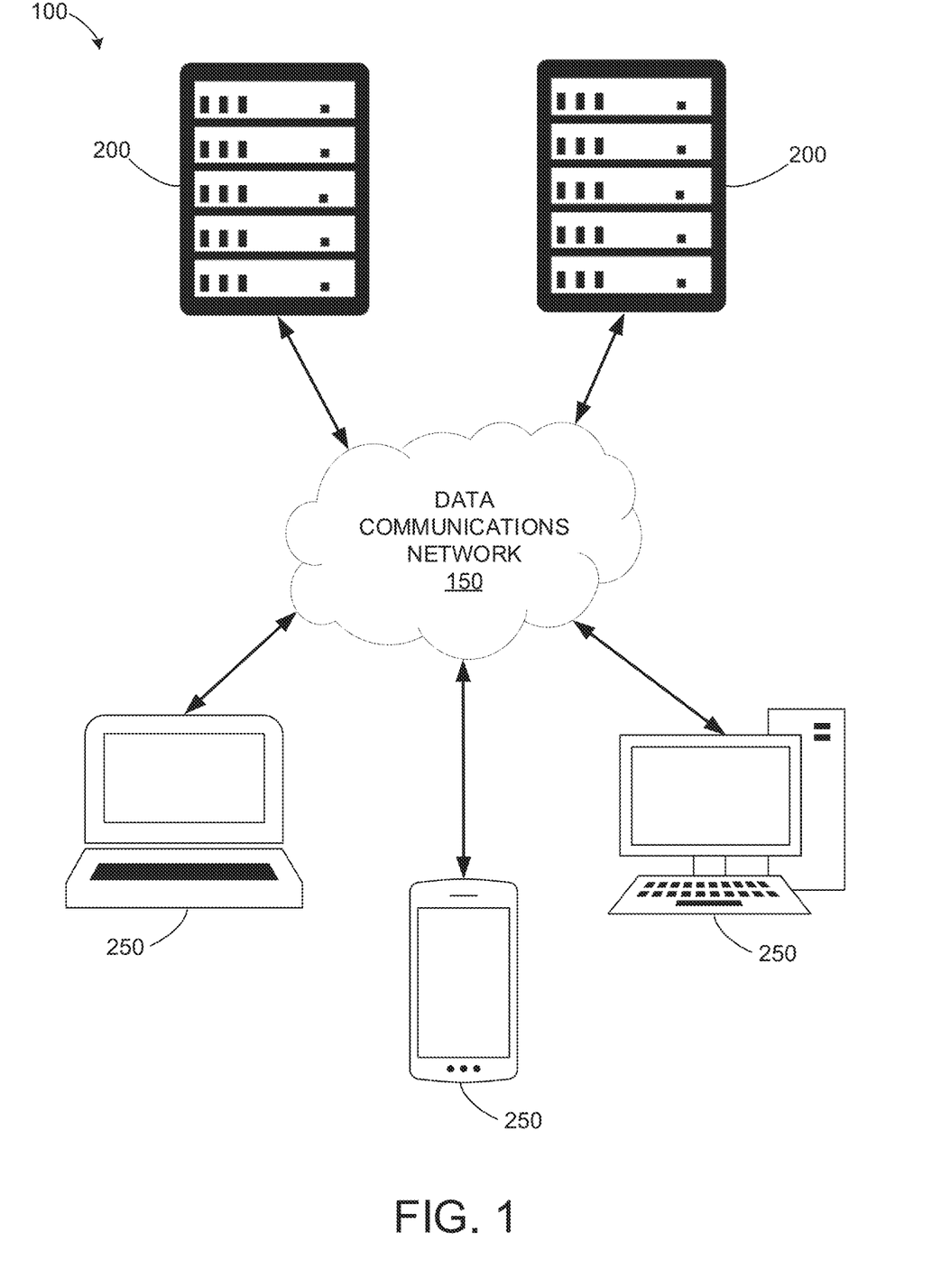
FIG. 1 is a block diagram of an exemplary data communications network, according to embodiments of the technology described herein.
Figure 2:
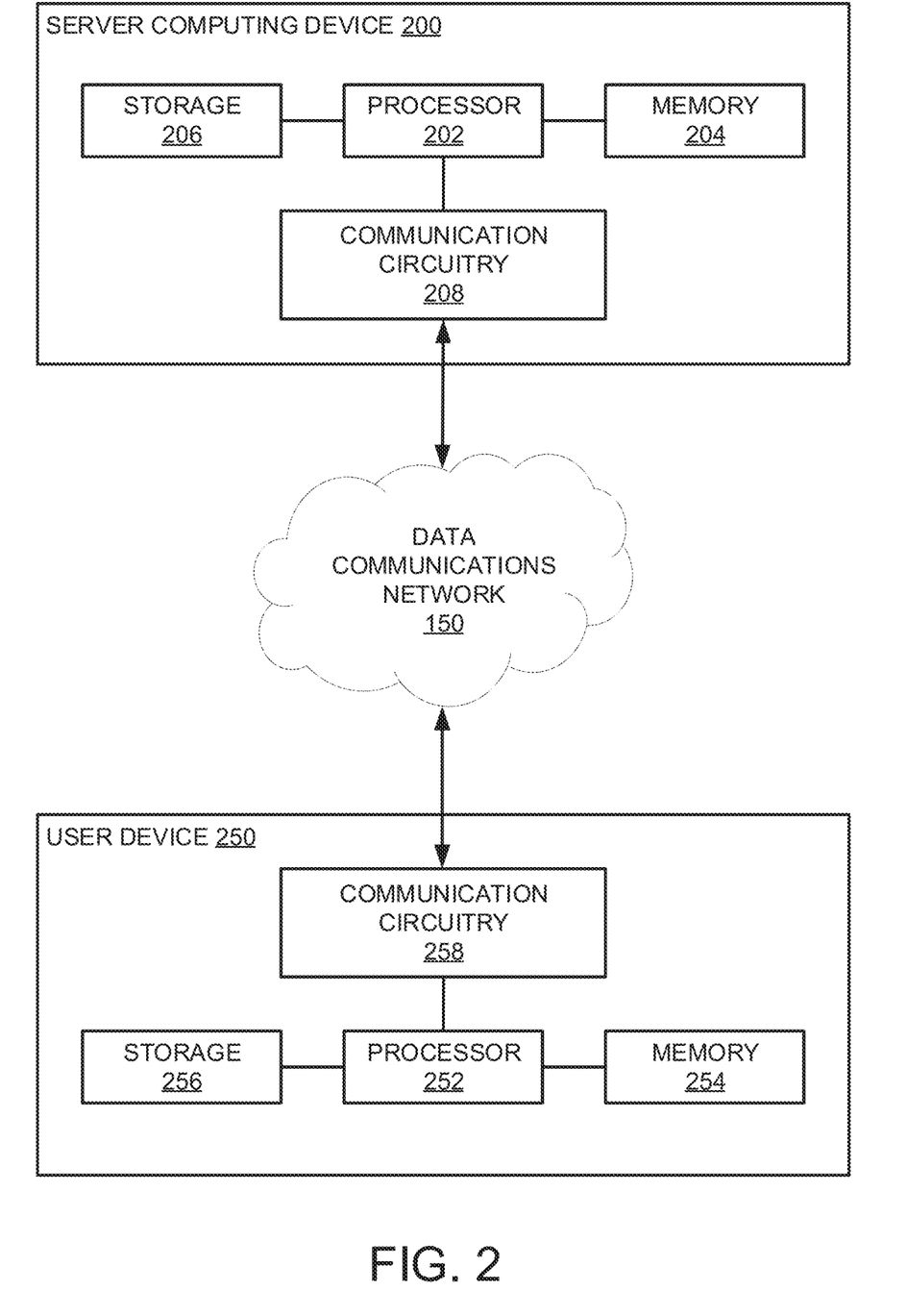
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth™, Wi-Fi™, or any comparable data transfer connection. The user devices 250 can include personal workstations, laptops, tablets, mobile devices, or any other comparable device.

Figure 3:
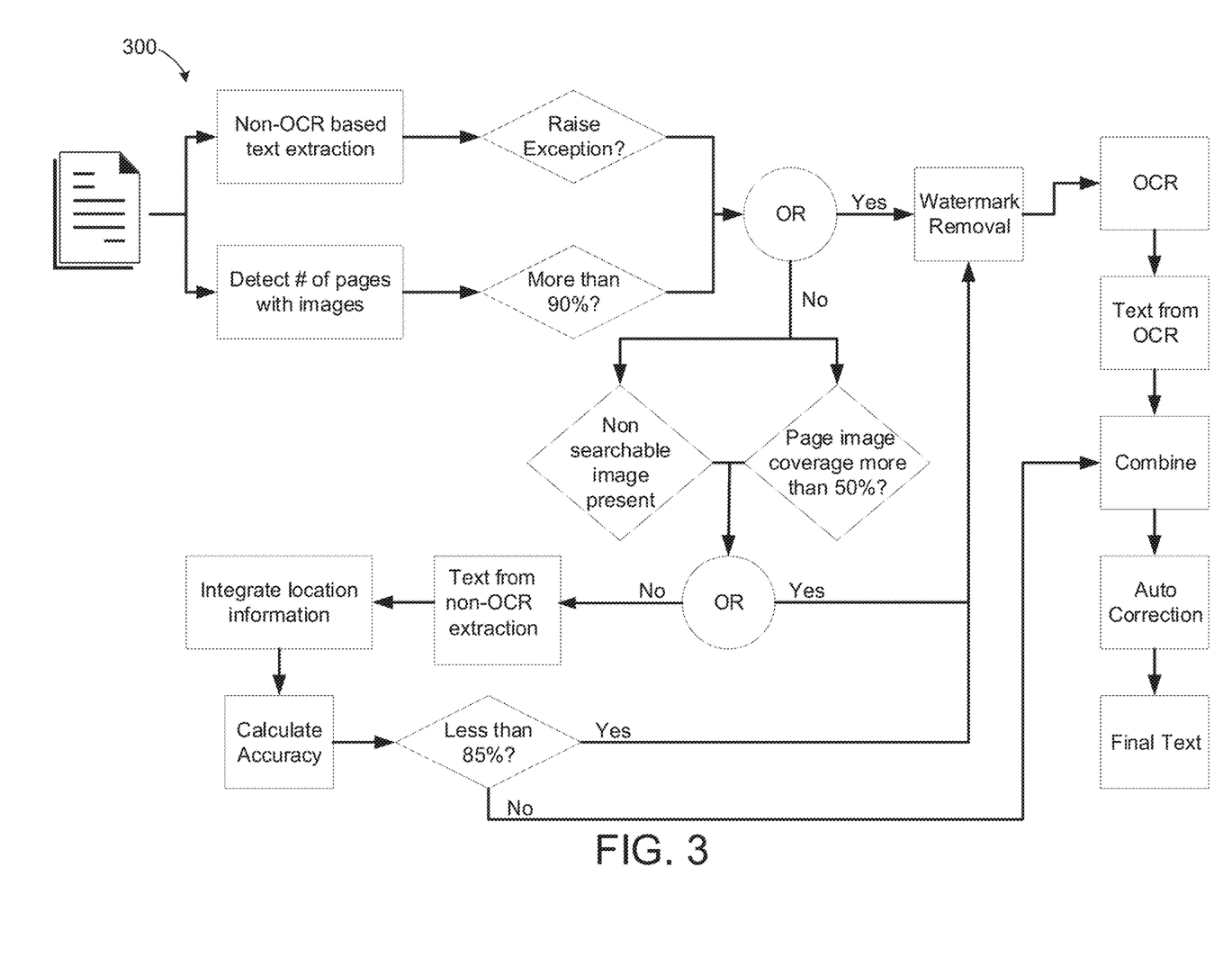
FIG. 3 is a flow diagram of a computer-implemented method for extracting data from electronic documents, according to embodiments of the technology described herein.

Referring to FIG. 3, a process 300 for extracting data from electronic documents is illustrated. Process 300 begins by receiving an electronic document and proceeding to perform non-OCR based text extraction on the electronic document and detect the number of pages of the electronic document with images. If the non-OCR based text extraction raises an exception or if the number of pages of the electronic document with images amounts to more than 90% of the electronic document, process 300 proceeds with watermark removal and optical character recognition of the entire electronic document.

If the non-OCR based text extraction does not raise an exception and the number of pages of the electronic document with images amounts to less than 90% of the electronic document, process 300 proceeds to analyze the electronic document on a page by page basis. For example, process 300 proceeds by determining if there is a non-searchable image present in the page being analyzed, or if the page image coverage is more than 50%. If there is a non-searchable image present in the page being analyzed or if the page image coverage is more than 50%, process 300 proceeds with watermark removal and OCR of the page.

If there is no non-searchable image present in the page being analyzed and the page image coverage is less than 50%, process 300 proceeds with the text from the non-OCR based extraction. Process 300 proceeds to calculate an accuracy after location information is integrated. If the accuracy of the non-OCR based text extraction is less than 85%, process 300 proceeds with watermark removal and OCR of the page. If the accuracy of the non-OCR based text extraction is more than 85%, process 300 proceeds to combine the text from the non-OCR based extraction and any text extracted using OCR. Process 300 finishes by performing an auto correction on the combined text to produce the final text.

Figure 4:
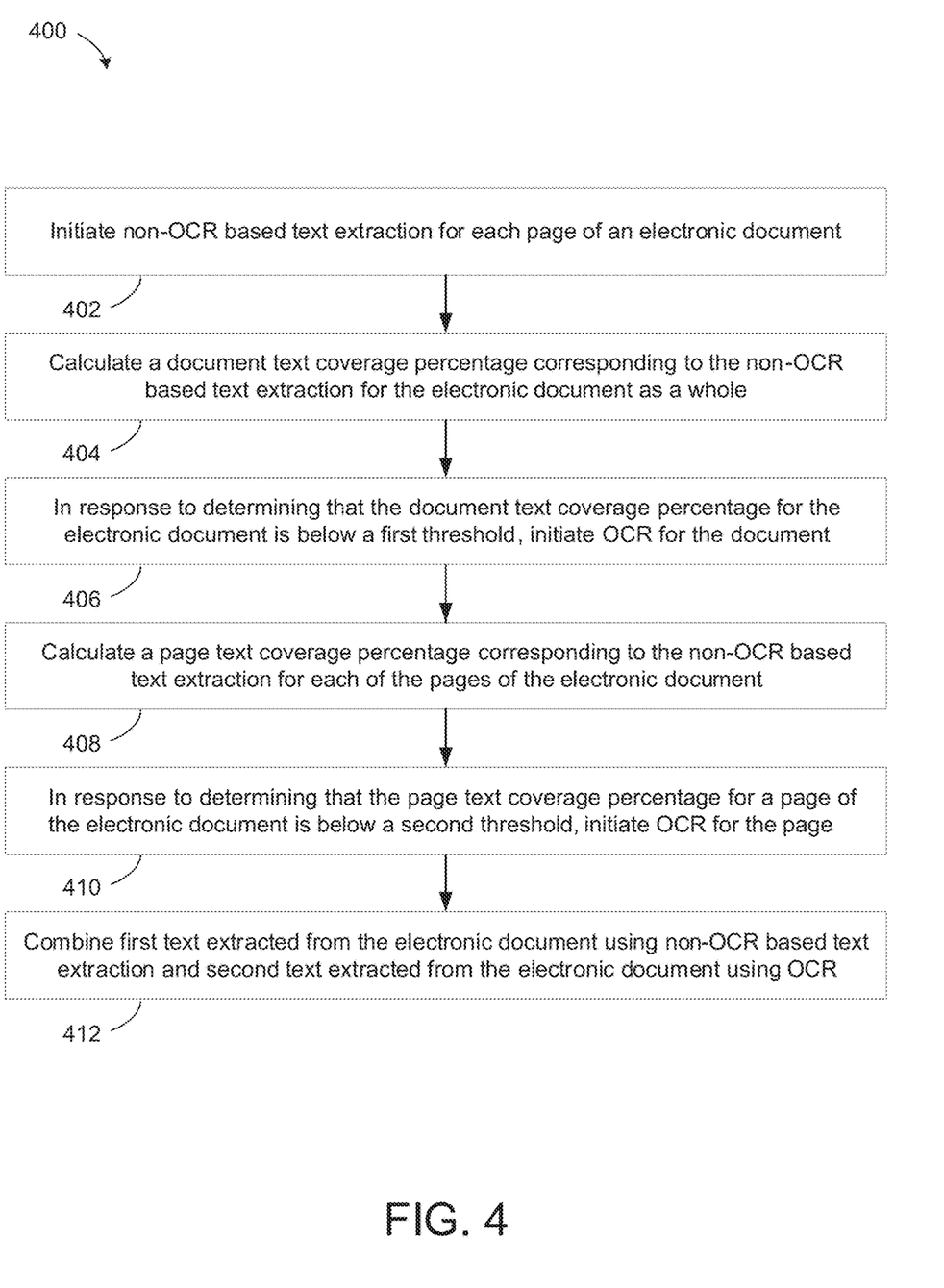
FIG. 4 is a flow diagram of a computer-implemented method for extracting data from electronic documents using optical character recognition (OCR) and non-OCR based text extraction, according to embodiments of the technology described herein.

Referring to FIG. 4, a process 400 for extracting data from electronic documents using optical character recognition (OCR) and non-OCR based text extraction is illustrated. Process 400 begins by initiating non-OCR based text extraction for each of the pages of an electronic document in step 402. Process 400 continues by calculating a document text coverage percentage corresponding to the non-OCR based text extraction for the electronic document as a whole in step 404. Process 400 continues by, in response to determining that the document text coverage percentage the electronic document is below a first threshold, initiating OCR for the electronic document as a whole in step 406.

Process 400 continues by calculating a page text coverage percentage corresponding to the non-OCR based text extraction for each of the pages in the electronic document in step 408. Process 400 continues by, in response to determining that the page text coverage percentage for one or more pages is below a second threshold, initiating OCR for the one or more pages of the electronic document in step 410. Process 400 finishes by combining first text extracted from the electronic document using non-OCR based text extraction and second text extracted from the electronic document using OCR in step 412.

Process 400 can be implemented using a system for extracting data from electronic documents using OCR and non-OCR based text extraction. The system can include a server computing device 200 communicatively coupled to a database over a network 150. The server computing device 200 is configured to initiate non-OCR based text extraction for each the pages of an electronic document. The server computing device 200 is also configured to calculate a document text coverage percentage corresponding to the non-OCR based text extraction for the electronic document as a whole.

The server computing device 200 is further configured to, in response to determining that the document text coverage percentage for the electronic document as a whole is below a first threshold, initiate OCR for the electronic document. The server computing device 200 is also configured to calculate a page text coverage percentage corresponding to the non-OCR based text extraction for one or more pages of the electronic document. The server computing device 200 is further configured to, in response to determining that the page text coverage percentage for one or more pages is below a second threshold, initiate OCR for the one or more pages of the electronic document. The server computing device 200 is also configured to combine first text extracted from the electronic document using non-OCR based text extraction and second text extracted from the electronic document using OCR.

Figure 5:
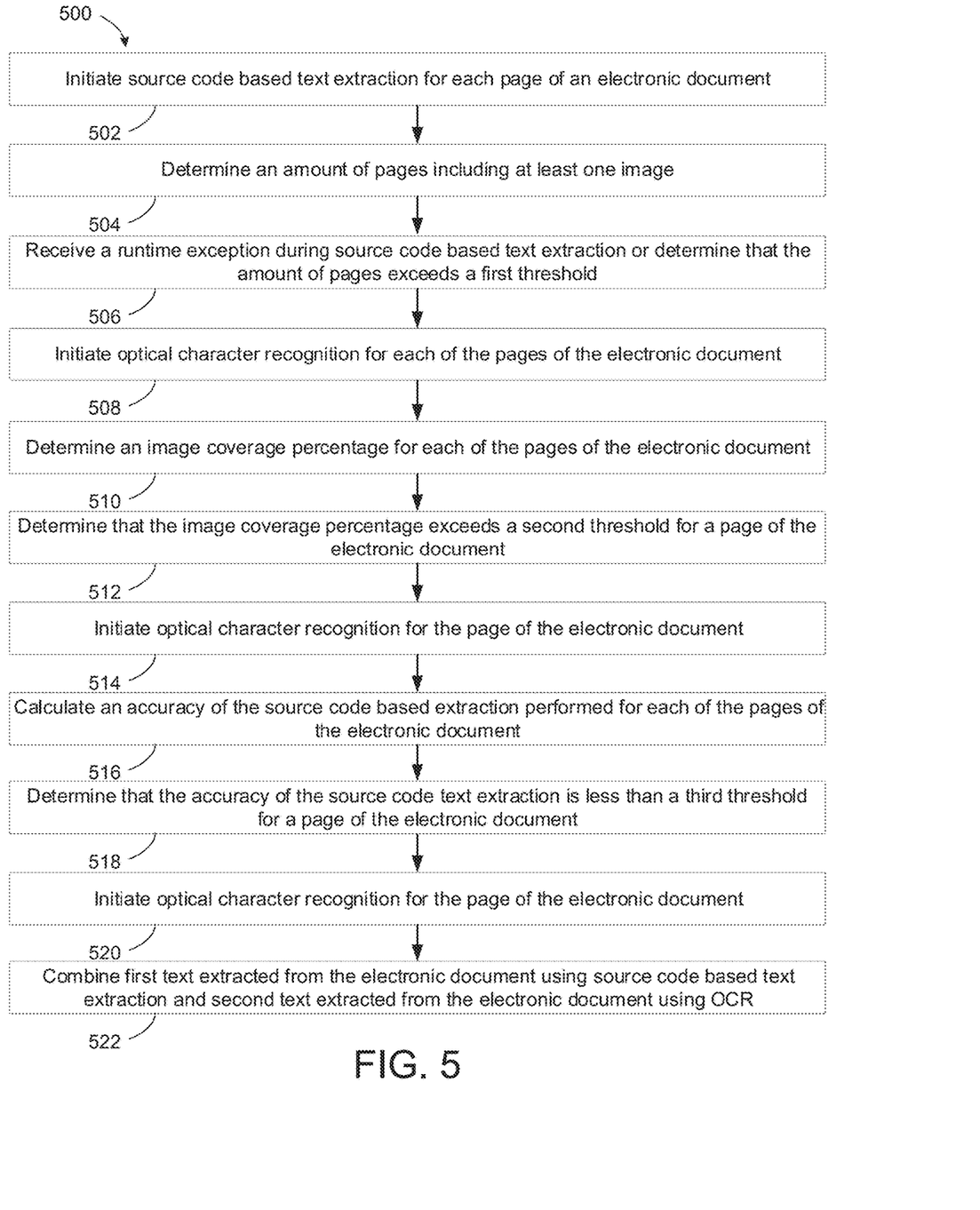
FIG. 5 is a flow diagram of a computer-implemented method for extracting data from electronic documents using non-OCR based text extraction and optical character recognition, according to embodiments of the technology described herein.

Referring to FIG. 5, a process 500 for extracting data from electronic documents using non-OCR based text extraction and optical character recognition is illustrated. Process 500 begins by initiating non-OCR based text extraction for each page of an electronic document in step 502. Process 500 continues by determining an amount of pages including at least one image in step 504. Process 500 continues by receiving a runtime exception during non-OCR based text extraction or determining that the amount of pages exceeds a first threshold in step 506. In some embodiments, the first threshold is at least 90% of the pages of the electronic document.

Process 500 continues by initiating optical character recognition for each of the pages of the electronic document in step 508. Process 500 continues by determining an image coverage percentage for each of the pages of the electronic document in step 510. Process 500 continues by determining that the image coverage percentage exceeds a second threshold for a page of the electronic document in step 512. In some embodiments, the second threshold is an image coverage of at least 50%. Process 500 continues by initiating optical character recognition for the page of the electronic document in step 514. Process 500 continues by calculating an accuracy of the non-OCR based text extraction performed for each of the pages of the electronic document in step 516.

Process 500 continues by determining that the accuracy of the non-OCR based text extraction is less than a third threshold for a page of the electronic document in step 518. In some embodiments, the third threshold is an accuracy of at least 85%. Process 500 continues by initiating optical character recognition for the page of the electronic document in step 520. Process 500 finishes by combining first text extracted from the electronic document using non-OCR based text extraction and second text extracted from the electronic document using optical character recognition in step 522.

In some embodiments, process 500 continues by generating a data structure including the combined first text and second text extracted from the electronic document and storing the data structure in a database.

In some embodiments, process 500 continues by determining, for each of the pages of the electronic document, whether the page of the electronic document includes a non-searchable image. For example, in some embodiments, process 500 continues by, in response to determining that the page of the electronic document includes the non-searchable image, initiating optical character recognition for the page of the electronic document.

In some embodiments, process 500 continues by calculating the accuracy of the non-OCR based text extraction by calculating a percentage of extracted words that are English words. In some embodiments, process 500 continues by removing one or more watermarks from the electronic document prior to initiating optical character recognition. In other embodiments, process 500 continues by correcting the combined first text and second text extracted from the electronic document by replacing misspelled words.

Process 500 can be implemented using a system for extracting data from electronic documents using non-OCR based text extraction and optical character recognition. The system can include a server computing device 200 communicatively coupled to a database system over a network 150. The server computing device 200 is configured to initiate non-OCR based text extraction for each of the pages of an electronic document. The server computing device 200 is also configured to determine an amount of pages includes at least one image. The server computing device 200 is also configured to receive a runtime exception during non-OCR based text extraction or determine that the amount of pages exceeds a first threshold. In some embodiments, the first threshold is at least 90% of the pages of the electronic document.

The server computing device 200 is further configured to initiate optical character recognition for each of the pages of the electronic document. The server computing device 200 is also configured to determine an image coverage percentage for each of the pages of the electronic document. The server computing device 200 is further configured to determine that the image coverage percentage exceeds a second threshold for a page of the electronic document. In some embodiments, the second threshold is an image coverage of at least 50%. The server computing device 200 is also configured to initiate optical character recognition for the page of the electronic document. The server computing device 200 is further configured to calculate an accuracy of the non-OCR based text extraction performed for each of the pages of the electronic document.

The server computing device 200 is also configured to determine that the accuracy of the non-OCR based text extraction is less than a third threshold for a page of the electronic document. In some embodiments, the third threshold is an accuracy of at least 85%. The server computing device 200 is further configured to initiate optical character recognition for the page of the electronic document. The server computing device 200 is also configured to combine first text extracted from the electronic document using non-OCR based text extraction and second text extracted from the electronic document using optical character recognition.

In some embodiments, the server computing device 200 is configured to generate a data structure including the combined first text and second text extracted from the electronic document and store the data structure in a database.

In some embodiments, the server computing device 200 is configured to determine, for each of the pages of the electronic document, whether the page of the electronic document includes a non-searchable image. For example, in some embodiments, the server computing device 200 is configured to, in response to determining that the page of the electronic document includes the non-searchable image, initiate optical character recognition for the page of the electronic document.

In some embodiments, the server computing device 200 is configured to calculate the accuracy of the non-OCR based text extraction by calculating a percentage of extracted words that are English words. In some embodiments, the server computing device 200 is configured to remove one or more watermarks from the electronic document prior to initiating optical character recognition. In some embodiments, the server computing device 200 is configured to correct the combined first text and second text extracted from the electronic document by replacing misspelled words.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for extracting data from electronic documents using optical character recognition (OCR) and non-OCR based text extraction, the method comprising:
   initiating, by a server computing device, non-OCR based text extraction for each of a plurality of pages of an electronic document;
   calculating, by the server computing device, a document text coverage percentage corresponding to the non-OCR based text extraction for the electronic document as a whole;
   in response to determining that the document text coverage percentage for the electronic document as a whole is below a first threshold, initiating, by the server computing device, OCR for the electronic document as a whole;
   calculating, by the server computing device, a page text coverage percentage corresponding to the non-OCR based text extraction for one or more pages of the electronic document;
   in response to determining that the page text coverage percentage for one or more pages of the electronic document is below a second threshold, initiating, by the server computing device, OCR for the one or more pages of the electronic document; and
   combining, by the server computing device, first text extracted from the electronic document using non-OCR based text extraction and second text extracted from the electronic document using OCR.

2. The computerized method of claim 1, wherein the server computing device is further configured to:
   generate a data structure comprising the combined first text and second text extracted from the electronic document; and
   store the data structure in a database.

3. The computerized method of claim 1, wherein the server computing device determines, for each of the plurality of pages of the electronic document, whether the page of the plurality of pages of the electronic document comprises a non-searchable image.

4. The computerized method of claim 3, wherein the server computing device, in response to determining that the page of the plurality of pages of the electronic document comprises the non-searchable image, initiates optical character recognition for the page of the plurality of pages of the electronic document.

5. The computerized method of claim 1, wherein the server computing device calculates the accuracy of the non-OCR based text extraction by calculating a percentage of extracted words that are English words.

6. The computerized method of claim 1, wherein the server computing device removes one or more watermarks from the electronic document prior to initiating optical character recognition.

7. The computerized method of claim 1, wherein the server computing device corrects the combined first text and second text extracted from the electronic document by replacing misspelled words.

8. The computerized method of claim 1, wherein the first threshold comprises 90% of the plurality of pages of the electronic document.

9. The computerized method of claim 1, wherein the second threshold comprises an image coverage of 50%.

10. The computerized method of claim 1, wherein the third threshold comprises an accuracy of 85%.

11. A system for extracting data from electronic documents using non-optical character recognition (OCR) based text extraction and OCR, the system comprising a server computing device communicatively coupled to a database over a network, the server computing device having a memory for storing computer-executable instructions and a processor that executes the computer-executable instructions to:
  initiate non-OCR based text extraction for each of a plurality of pages of an electronic document;
  determine an amount of pages of the plurality of pages comprising at least one image;
  receive a runtime exception during non-OCR based text extraction or determine that the amount of pages exceeds a first threshold;
  initiate optical character recognition for each of the plurality of pages of the electronic document;
  determine an image coverage percentage for each of the plurality of pages of the electronic document;
  determine that the image coverage percentage exceeds a second threshold for a page of the plurality of pages of the electronic document;
  initiate optical character recognition for the page of the plurality of pages of the electronic document;
  calculate an accuracy of the non-OCR based text extraction performed for each of the plurality of pages of the electronic document;
  determine that the accuracy of the non-OCR based text extraction is less than a third threshold for a page of the plurality of pages of the electronic document;
  initiate optical character recognition for the page of the plurality of pages of the electronic document; and
  combine first text extracted from the electronic document using non-OCR based text extraction and second text extracted from the electronic document using optical character recognition.

12. The system of claim 11, wherein the server computing device determines, for each of the plurality of pages of the electronic document, whether the page of the plurality of pages of the electronic document comprises a non-searchable image.

13. The system of claim 12, wherein the server computing device, in response to determining that the page of the plurality of pages of the electronic document comprises the non-searchable image, initiates optical character recognition for the page of the plurality of pages of the electronic document.

14. The system of claim 11, wherein the server computing device calculates the accuracy of the non-OCR based text extraction by calculating a percentage of extracted words that are English words.

15. The system of claim 11, wherein the server computing device removes one or more watermarks from the electronic document prior to initiating optical character recognition.

16. The system of claim 11, wherein the server computing device corrects the combined first text and second text extracted from the electronic document by replacing misspelled words.

17. The system of claim 11, wherein the first threshold comprises 90% of the plurality of pages of the electronic document.

18. The system of claim 11, wherein the second threshold comprises an image coverage of 50%.

19. The system of claim 11, wherein the third threshold comprises an accuracy of 85%.

20. A computerized method for extracting data from electronic documents using non-optical character recognition (OCR) based text extraction and OCR, the method comprising:
  initiating, by a server computing device, non-OCR based text extraction for each of a plurality of pages of an electronic document;
  determining, by the server computing device, an amount of pages of the plurality of pages comprising at least one image;
  receiving, by the server computing device, a runtime exception during non-OCR based text extraction or determining, by the server computing device, that the amount of pages exceeds a first threshold;
  initiating, by the server computing device, optical character recognition for each of the plurality of pages of the electronic document;
  determining, by the server computing device, an image coverage percentage for each of the plurality of pages of the electronic document;
  determining, by the server computing device, that the image coverage percentage exceeds a second threshold for a page of the plurality of pages of the electronic document;
  initiating, by the server computing device, optical character recognition for the page of the plurality of pages of the electronic document;
  calculating, by the server computing device, an accuracy of the non-OCR based text extraction performed for each of the plurality of pages of the electronic document;
  determining, by the server computing device, that the accuracy of the non-OCR based text extraction is less than a third threshold for a page of the plurality of pages of the electronic document;
  initiating, by the server computing device, optical character recognition for the page of the plurality of pages of the electronic document; and combining, by the server computing device, first text extracted from the electronic document using non-OCR based text extraction and second text extracted from the electronic document using optical character recognition.

\* \* \* \* \*